United States Patent
Endo et al.

(10) Patent No.: US 6,493,100 B1
(45) Date of Patent: Dec. 10, 2002

(54) PRINTING SYSTEM

(75) Inventors: Yoshinori Endo, Toyota (JP); Tsuyoshi Yamanaka, Komaki (JP)

(73) Assignee: Brother Kogyo Kabushiki Kaisha, Nagoya (JP)

(\*) Notice: Subject to any disclaimer, the term of this patent is extended or adjusted under 35 U.S.C. 154(b) by 0 days.

(21) Appl. No.: 09/095,653

(22) Filed: Jun. 11, 1998

(30) Foreign Application Priority Data

Jun. 16, 1997 (JP) .............................................. 9-176464
Sep. 12, 1997 (JP) .............................................. 9-248281

(51) Int. Cl.$^7$ .............................................. G06K 15/00
(52) U.S. Cl. ........................................ 358/1.14; 399/70
(58) Field of Search .................... 395/112; 358/1.1–1.9, 358/1.11–1.18, 419–423, 305; 399/13, 43, 70, 88; 345/210–212, 52, 102; 347/5, 128, 162, 168, 237, 247

(56) References Cited

U.S. PATENT DOCUMENTS

| | | | |
|---|---|---|---|
| 5,241,349 A | * 8/1993 | Nagasaka | 355/285 |
| 5,257,206 A | * 10/1993 | Hanson | 364/502 |
| 5,481,656 A | * 1/1996 | Wakabayashi et al. | 358/1.16 |
| 5,627,882 A | * 5/1997 | Chien et al. | 379/61 |
| 5,636,332 A | * 6/1997 | Hibino | 358/1.13 |
| 5,682,273 A | * 10/1997 | Hetzler | 360/75 |
| 5,715,278 A | * 2/1998 | Croft et al. | 375/224 |
| 5,751,925 A | * 5/1998 | Kataoka et al. | 358/1.16 |
| 5,809,369 A | * 9/1998 | Furuya et al. | 399/70 |
| 5,974,551 A | * 10/1999 | Lee | 713/300 |
| 5,978,553 A | * 11/1999 | Ikeda | 358/1.9 |

FOREIGN PATENT DOCUMENTS

| | | |
|---|---|---|
| JP | 7-17111 | 1/1995 |
| JP | 7-251550 | 10/1995 |
| JP | 7-271538 | 10/1995 |

\* cited by examiner

*Primary Examiner*—Gabriel Garcia
*Assistant Examiner*—King Y. Poon
(74) *Attorney, Agent, or Firm*—Oliff & Berridge, PLC (57) ABSTRACT

When the number of standby time values which exceeds the upper limit, stored in the standby time control section, is determined to be smaller than the predetermined number and the frequency of use of the printer is considered to be middle, the average value of the standby time values is calculated. The average value (time) obtained is subtracted from the sum of the upper limit and the lower limit of the standby time so that the resultant value is set as a sleep time. Thus, the suitable sleep time between the upper limit and the lower limit according to any variable operating condition of the printer can be set.

19 Claims, 11 Drawing Sheets

| S10 | THE LATEST STANDBY TIME DATA > UPPER LIMIT |
|---|---|
| S11 | THE SECOND LATEST DATA > UPPER LIMIT |
| S12 | SLEEP TIME = LOWER LIMIT |
| S13 | THE LATEST DATA < MIDDLE LIMIT |
| S14 | SLEEP TIME = UPPER LIMIT |
| S15 | THE NUMBER OF DATA EXCEEDING UPPER LIMIT < PREDETERMINED NUMBER |
| S16 | SLEEP TIME = LOWER LIMIT |
| S17 | CALCULATE AVERAGE OF DATA WITH CONSIDERING DATA EXCEEDING UPPER LIMIT AS UPPER LIMIT |
| S18 | SLEEP TIME =(UPPER LIMIT+LOWER LIMIT)−AVERAGE TIME (AVERAGE VALUE) |
| S19 | SLEEP TIME > UPPER LIMIT |
| S20 | SLEEP TIME = UPPER LIMIT |

PRINTING SYSTEM

BACKGROUND OF THE INVENTION

1. Field of the Invention

The present invention relates to a printing system having a printer which enters a sleep mode if receives no signal representative of printing data for a predetermined period of time more than a sleep time, and more particularly to a printing system with a printer, capable of always setting a sleep time suitable for variable operating condition of the printer by controlling the record of standby time interval between a print start time in a present printing operation and a print end time in a printing operation executed just before the present printing operation in the printer.

2. Description of Related Art

Heretofore, for one of printers for printing in accordance with the print data transmitted from a personal computer and the like, for example, there has been known a printer capable of entering a sleep mode by cutting off the power supply to a part of a hard ware of the printer if it does not perform a printing operation for more than a preset period.

The sleep mode is an effective function for power saving in printers. Because it can avoid wasted power consumption caused by a toner fixing heater if continuously heated even when the printer does not perform printing for a long time.

The printer with the sleep mode, generally, is arranged so that it is released from the sleep mode on receiving a signal representative of print data from, for example, a personal computer and then starts a warming-up process. It, however the print data is transmitted from the personal computer to the printer in a sleep state, the printer could start a printing operation after a lapse of a remarkably long time from the signal transmit time, so that it takes a long time to complete the printing operation.

To avoid the above problems, for example, Japanese patent application unexamined publication No. 7-251550 discloses an image forming apparatus adapted for reducing power consumption by entering a sleep mode after a definite time from the completion of printing, in which the time T from the completion of printing to the entry in the sleep mode is set based on the interval between the completion of printing and the arrival of a next printing signal. In such the image forming apparatus, the time T to enter the sleep mode is changed based on the signal arriving interval so that the time T is shortened if the arriving interval of printing signal is long or lengthened if the same is short. This apparatus can avoid a long first print time when it is frequently used, and enter a sleep state promptly when it is not much used, resulting in the reduction of power consumption.

In the image forming apparatus mentioned above, although the time T from the completion of printing to the entry in a sleep state is determined based on the interval of the arrival of the next printing signal in consideration of the records of signal arriving intervals, the time T is merely roughly set. For instance, the time T is set to 10 min. for the arriving interval of the next printing signal of more than 30 min., to 15 min. for the signal arriving interval in the range of more than 10 min. and less than 30 min., and to 30 min. for the signal arriving interval of less than 10 min.

In the above way, the time T can not always be set to the most suitable value when the arriving interval of the next printing signal varies every moment according to operating condition of the image forming apparatus. In this regard, the apparatus is desired to flexibly change the time T in correspondence with the signal arriving interval even if it varies from moment to moment so that a first print time be prevented from becoming long and the apparatus promptly enter a sleep mode to thereby reduce power consumption of the apparatus, which increases efficiency.

SUMMARY OF THE INVENTION

The present invention has been made in view of the above circumstances and has an object to overcome the above problems and to provide a printing system that controls the record of standby time data from a print end time in the printing operation to a print start time in the next printing operation, so that a suitable sleep time be always determined according to an operating condition of the printer even if the condition varies every moment.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, there is provided a printing system having a printer which enters a sleep mode when it does not receive print data for more than a sleep time, the system comprising means for storing and controlling each standby time value in plural times printing operations, the standby time being a period between a start time of a present printing operation and an end time of a printing operation executed just before the present printing operation, and means for calculating a sleep time based on the standby time values stored in the standby time control means by putting weight on late values among the standby time values stored in the standby time control means.

The above printing system can set a suitable sleep time according to the operation condition of the printer in recent years. Accordingly, the most suitable sleep time can be determined based on the last record of standby time values even if the printer operating condition varies every moment.

According to the second aspect of the present invention, there is provided a printing system having a printer which enters a sleep mode when it does not receive print data for more than a sleep time, the system comprising means for storing and controlling standby time values in plural times printing operations, the standby time being a period between a start time of a present printing operation and an end time of a printing operation executed just before the present printing operation, and means for calculating a sleep time on the basis of the standby time values stored in the standby time control means by considering whether a number of standby time values exceeding a preset standard value, among the standby time values stored in the standby time control means, is larger than a predetermined number.

According to the third aspect of the present invention, there is provided a printing system having a printer which enters a sleep mode when it does not receive print data for more than a sleep time, the system comprising means for storing and controlling standby time values in plural times printing operations, the standby time being a period between a start time of a present printing operation and an end time of a printing operation executed just before the present printing operation, and means for calculating a sleep time on the basis of the standby time values stored in the standby time control means by considering an average value of the standby time values stored in the standby time control means.

According to the fourth aspect of the present invention, there is provided a printing system having a printer which enters a sleep mode when it does not receive print data for more than a sleep time, the system comprising means for storing and controlling standby time values in plural times printing operations, the standby time being a period between a start time of a present printing operation and an end time of a printing operation executed just before the present printing operation, means for judging whether a number of standby time values exceeding a standby time upper limit, among the standby time values stored in the standby time control means, is less than a predetermined number when a sleep time is set between the standby time upper limit and a standby time lower limit, means for calculating an average value of the standby time values when the judgement means determines that the number of the standby time values exceeding the standby time upper limit is less than the predetermined number, and means for calculating a sleep time based on the average value of the standby time values calculated by the average calculating means, the standby time upper limit, and the standby time lower limit.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

Figure 1:
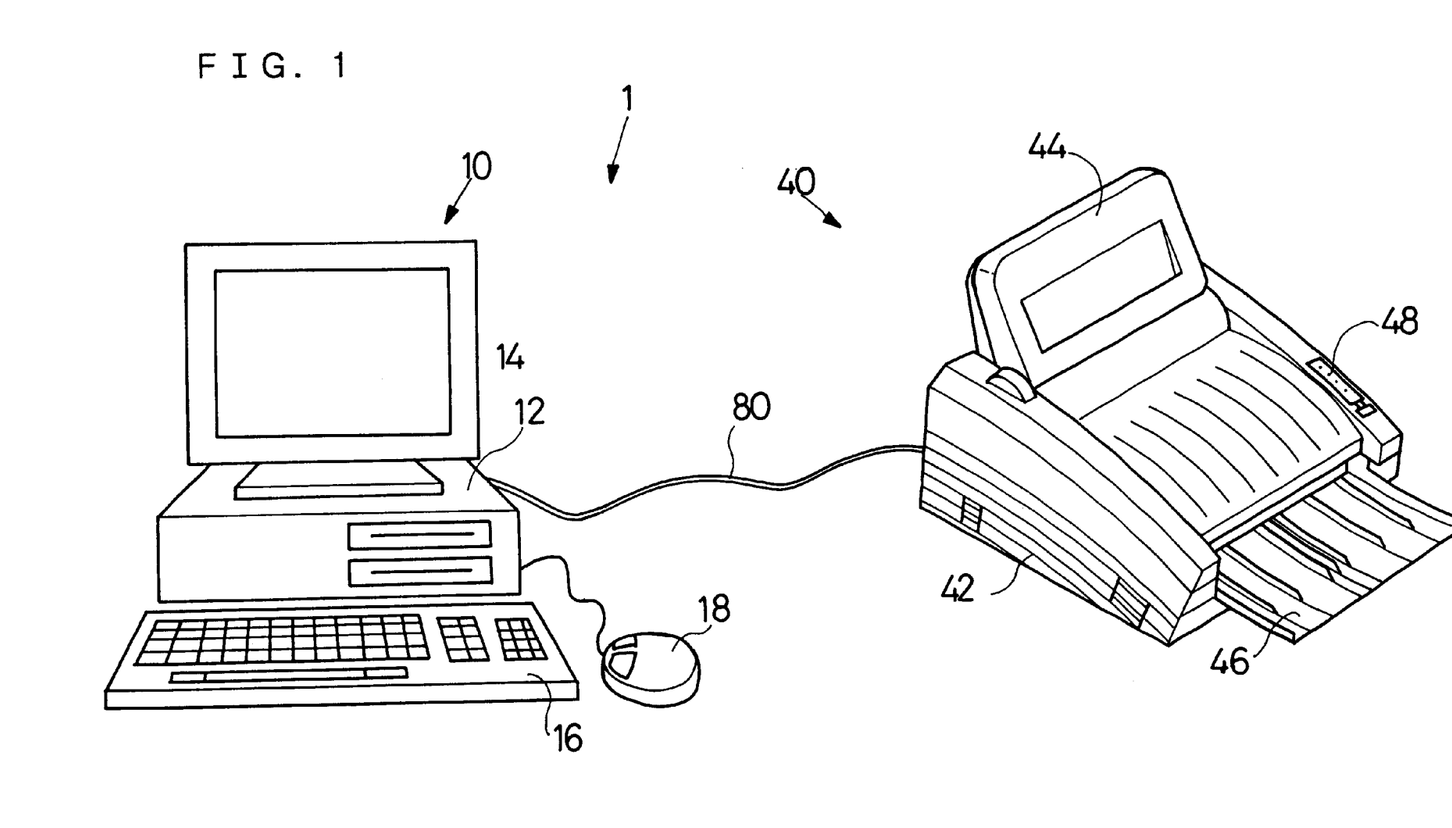
FIG. 1 is a perspective view of a printing system in an embodiment according to the present invention.

A detailed description of a preferred embodiment of a printing system embodying the present invention will now be given referring to the accompanying drawings. First, a schematic structure of the printing system in the embodiment will be described with reference to FIGS. 1 and 2. FIG. 1 is a perspective view of a printing system and FIG. 2 is a block diagram of a computer system and a laser printer in the printing system.

In FIG. 1, a printing system 1 has a computer system 10 and a laser printer 40 connected to the computer system 10 through a parallel cable 80. This computer system 10 is provided with a computer 12 as a central unit. The computer system 10 has also a display 14, a keyboard 16, and a mouse 18, all connected to the computer 12. The laser printer 40 is provided with a main body 42, a paper supply tray 44, a paper discharge tray 46, and others. A control panel 48 is provided on the upper plane of the main body 42.

Figure 2:
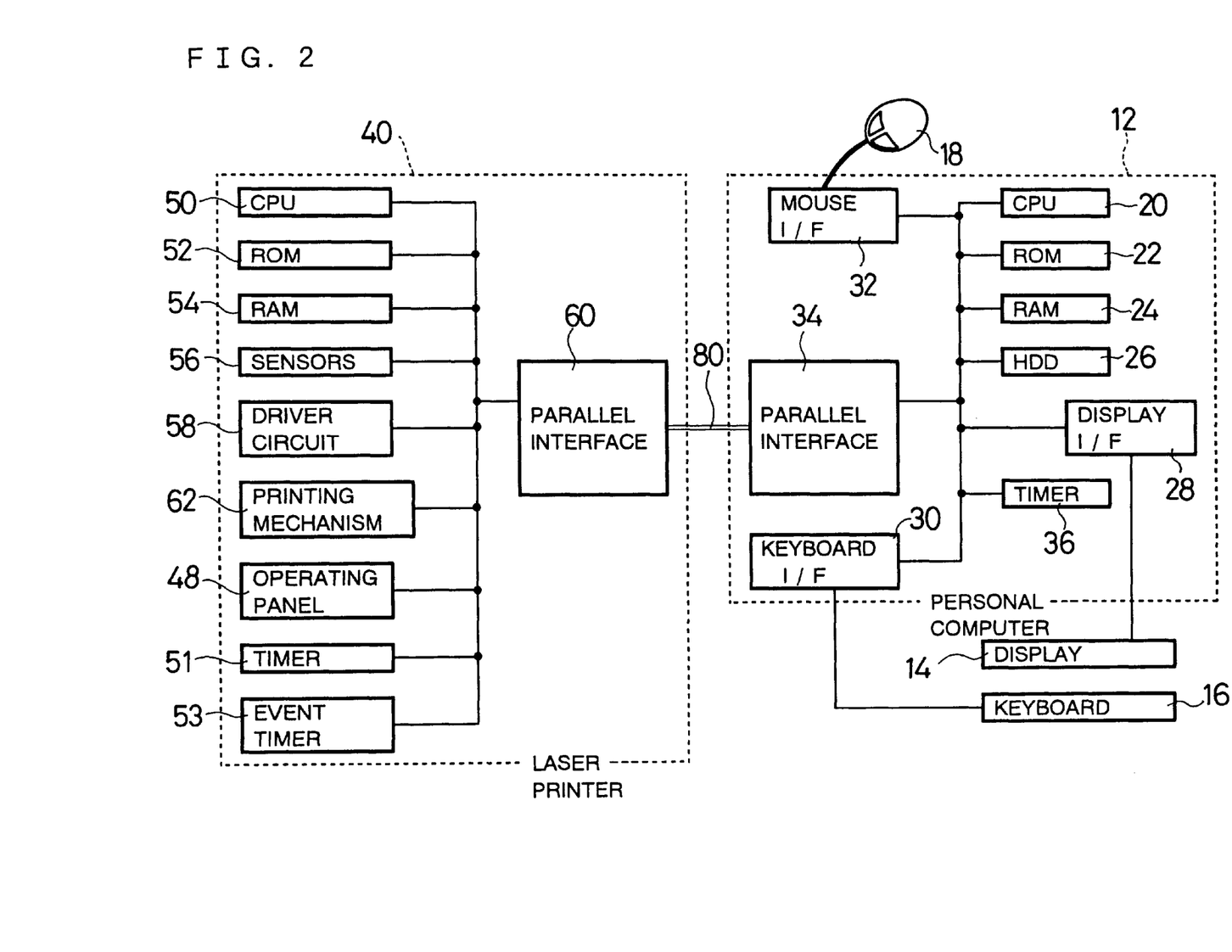
FIG. 2 is a block diagram of a computer system and a laser printer in the printing system.

In the computer 12, as shown in FIG. 2, a CPU 20, a ROM 22, a RAM 24, a hard disc device (HDD) 26, a display interface (display I/F) 28, a keyboard interface (keyboard I/F) 30, a mouse interface (mouse I/F) 32, a parallel interface 34, and a timer 36 are connected with one another through a bus line. The keyboard 16 is connected to the keyboard I/F 30. The mouse 18 is connected to the mouse I/F 32. An end of the parallel cable 80 is connected to the parallel I/F 34.

The HDD 26 stores a predetermined operating system (OS) and other application programs which are executed individually on the operating system.

Figure 3:
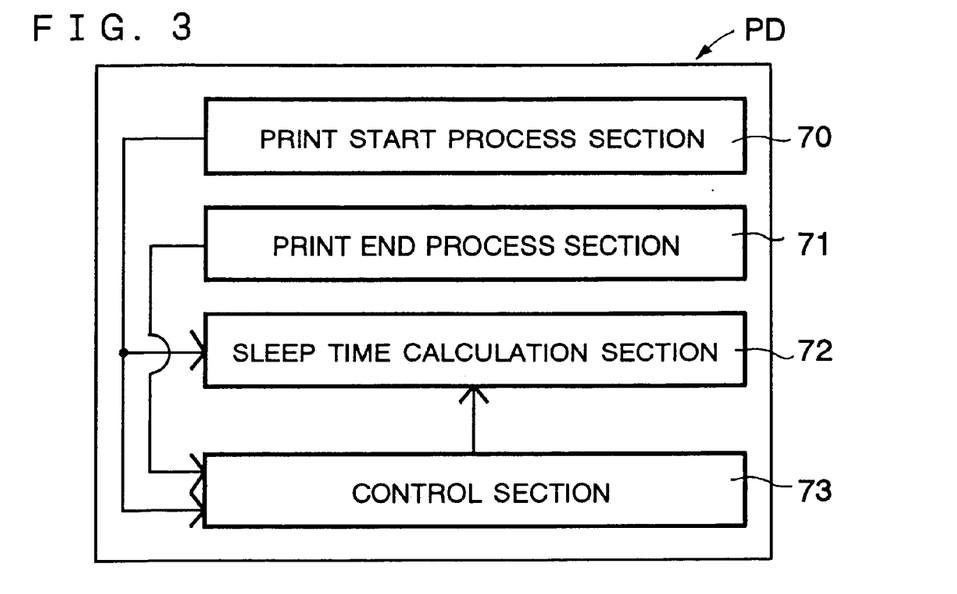
FIG. 3 is a schematic conceptual diagram of a printer driver.

Furthermore, the HDD 26 stores printer drivers corresponding to various types of printers, which will be loaded on the RAM 24 at a predetermined timing, under the control of the operating system. The printer driver is explained below, referring to FIG. 3 which is a schematic conceptual diagram of the printer driver. In FIG. 3, the printer driver PD consists of a print start process section 70, a print end process section 71, a sleep time calculation section 72, and a standby time control section 73. The print start process section 70 is called through the operating system at the start time of a printing operation, and sets the print start time in the standby time control section 73. The print end process section 71 is called through the operating system after the operation for developing predetermined print data is completed, and sets the print end time in the standby time control section 73.

The sleep time calculating section 72, which will be mentioned later, calculates a set value of the sleep time based on a list of standby time data (values) stored in the standby time control section 73. The standby time control section 73 stores a standby time every printing operation in a list form. The standby time is obtained on the basis of the print start time which is set by the print start process section 70 and the print end time which is set by the print end process section 71 in the previous printing operation. The data is constructed of, for example, for each printing data output terminal (i.e., each output port) for the laser printer 40, the print end time of the latest executed printing operation, the number of standby time values (for example, twenty values), and the list of standby time values arranged in order of the time length from the time when the values are obtained respectively.

Returning to FIG. 2, the laser printer 40 has a CPU 50, a ROM 52, a RAM 54, sensors 56 such as a paper supply sensor and a toner sensor, a driver circuit 58, a parallel interface 60, a control panel 48, a printing mechanism 62, and others. Also, a timer 51 and an event timer 52 are provided to the laser printer 40. The timer 51 is for clocking the present time in real time. The event timer 53 is for providing the interruption timing of a power-saving check process, or an interruption process executed during the printer process mentioned later. All sections except for the printing mechanism 60, namely, the CPU 50 to the parallel interface 60 are connected to one another through a bus line. The printing mechanism is connected to the driver circuit 58.

The printing mechanism 62 includes a well known photosensitive drum, a charger for charging the photosensitive drum, a laser irradiation mechanism for irradiating the photosensitive drum with a laser beam, a paper supply roller, a transfer roller, a developing roller, a cleaning roller, a motor for driving those rollers, and a heater for toner fixation. The printing mechanism 62 prints printing data on the paper supplied from the paper supply tray and discharge it after printing. The driver circuit 58 is to control the operation of each section in the printing mechanism 62 in accordance with the printing data temporarily stored in the RAM 54 pursuant to an instruction from the CPU 50 to enable the printing mechanism 62 to execute a printing operation.

Receiving no print data from the computer system 10 for more than a predetermined period, the laser printer 40 enters a sleep mode under the control of the CPU 50.

Figure 4:
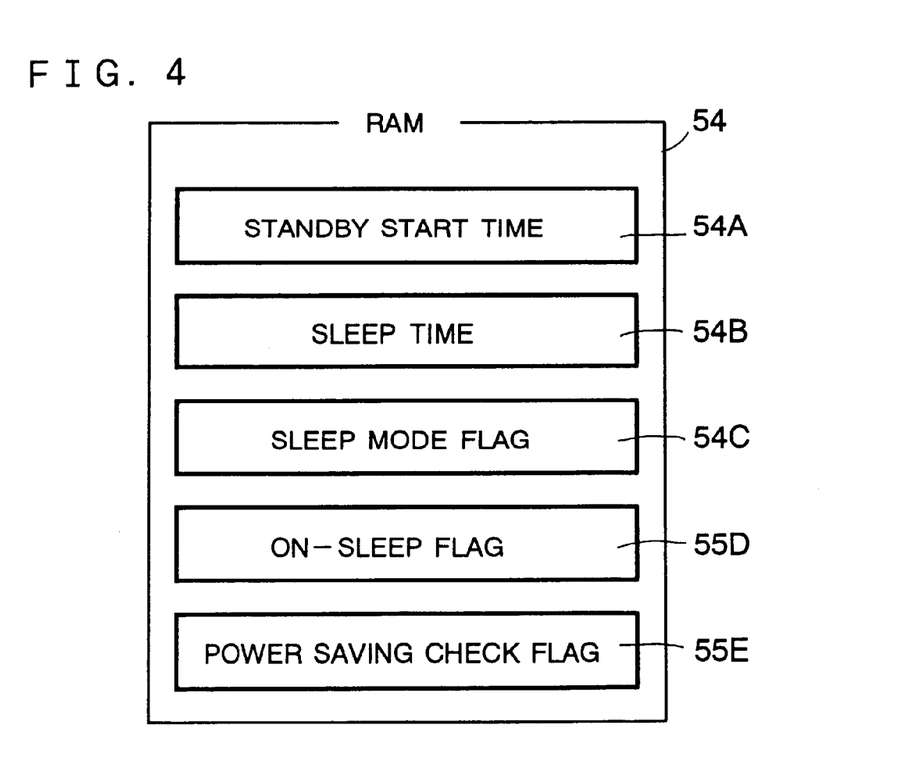
FIG. 4 is a schematic explanatory diagram of a RAM in the laser printer.

The RAM 54, as shown in FIG. 4, includes a standby start time memory area 54A for storing the standby start time corresponding to the print end time in each printing operation, a sleep time memory area 54B for storing the sleep time obtained by calculation in the sleep time calculation section 72, a sleep mode flag 54C that will be set when a sleep mode is established, an on-sleep flag 54D for showing the printer is in a sleep mode, and a power-saving check flag 54E for indicating whether a check is required or not to determine whether the printer should be shifted into a sleep state.

Figure 5:
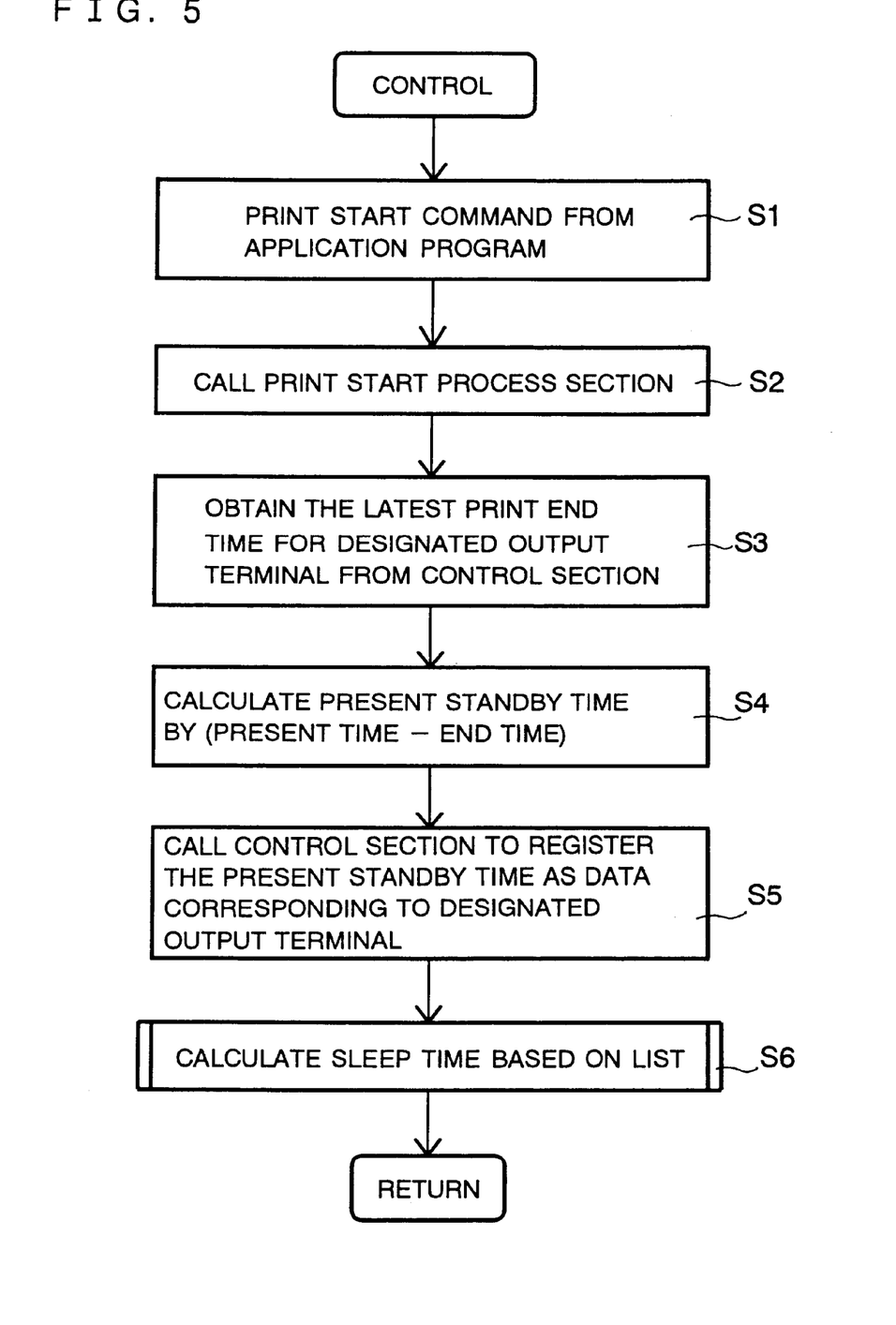
FIG. 5 is a flowchart of a routine for control of a standby time process.
Figure 6:
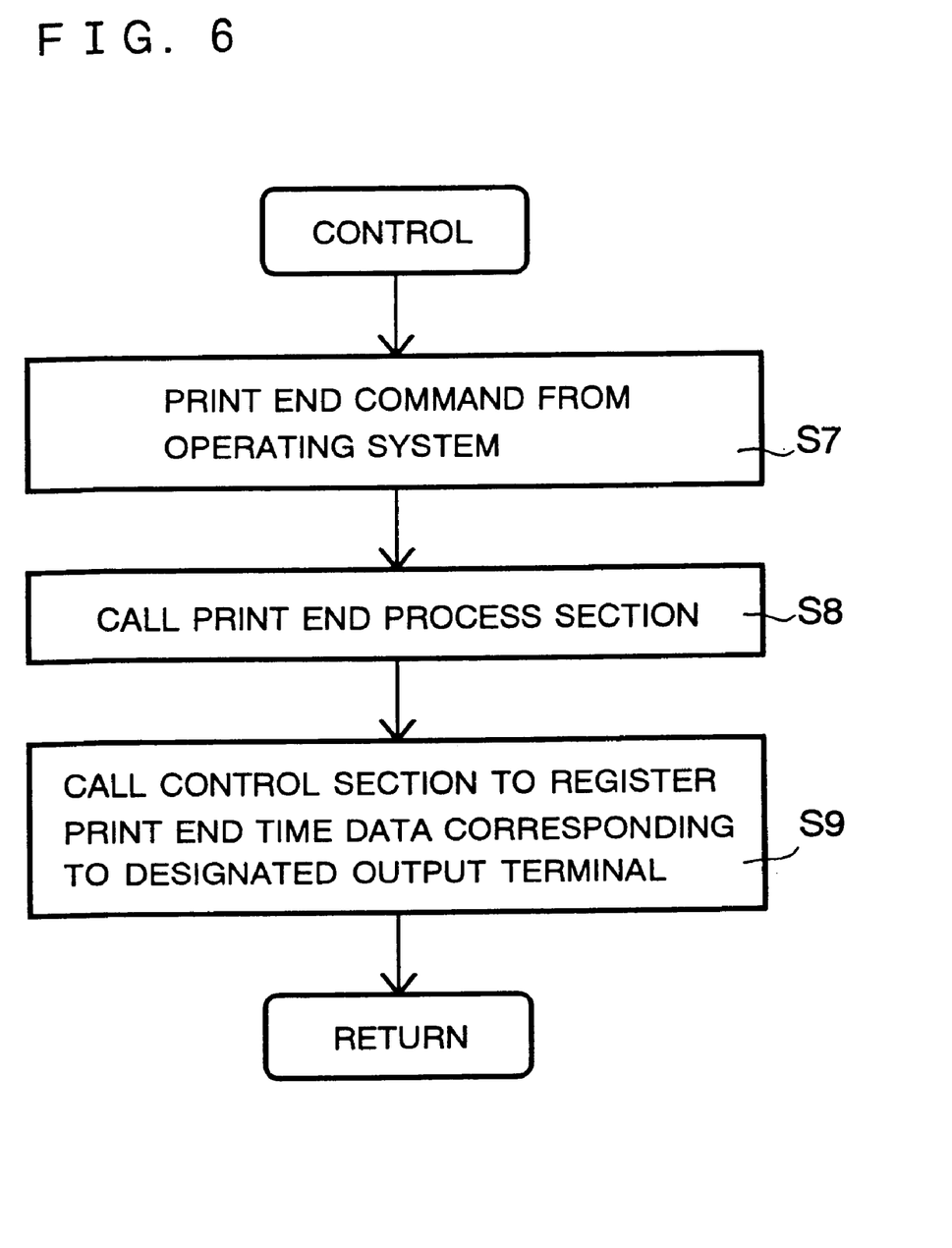
FIG. 6 is a flowchart of a routine for control of a standby time process.

Next, the standby time control process executed by the printer driver PD in the printing system 1 constructed as above will be described with reference to FIGS. 5 and 6. FIGS. 5 and 6 are flowcharts of a routine for control of a standby time process.

In FIG. 5, an application program in the computer 12 provides a print start command in a step (referred to as "S" hereinafter) 1, and the print start process section 70 of the printer driver PD is called in S2. In response to the call, in S3, the print end time in the latest printing operation with respect to a designated output port is obtained from the standby time control section 73. In S4, by the subtraction of the end time obtained in S3 from the present time obtained by the timer 36, the standby time at a present is given. After that, in S6, on the basis of the standby time list stored in the standby time control section 73, the sleep time is calculated in the sleep time calculation section 72. The sleep time calculating process in S6 is mentioned later.

In FIG. 6, when the operating system that is the base of the application program provides an print end command (S7), the print end process section 71 is called (S8) to control the standby time at the end of a printing operation. In S9, subsequently, the standby time control section 73 is called to register the present time as the print end time with respect to the designated output port.

By the process for registering the standby time at the print start shown in FIG. 5 and the process for registering the standby time at the print end shown in FIG. 6, the standby time values for the predetermined number of printing operations are subsequently produced and stored in a list form in the standby time control section 73.

Figure 7A:
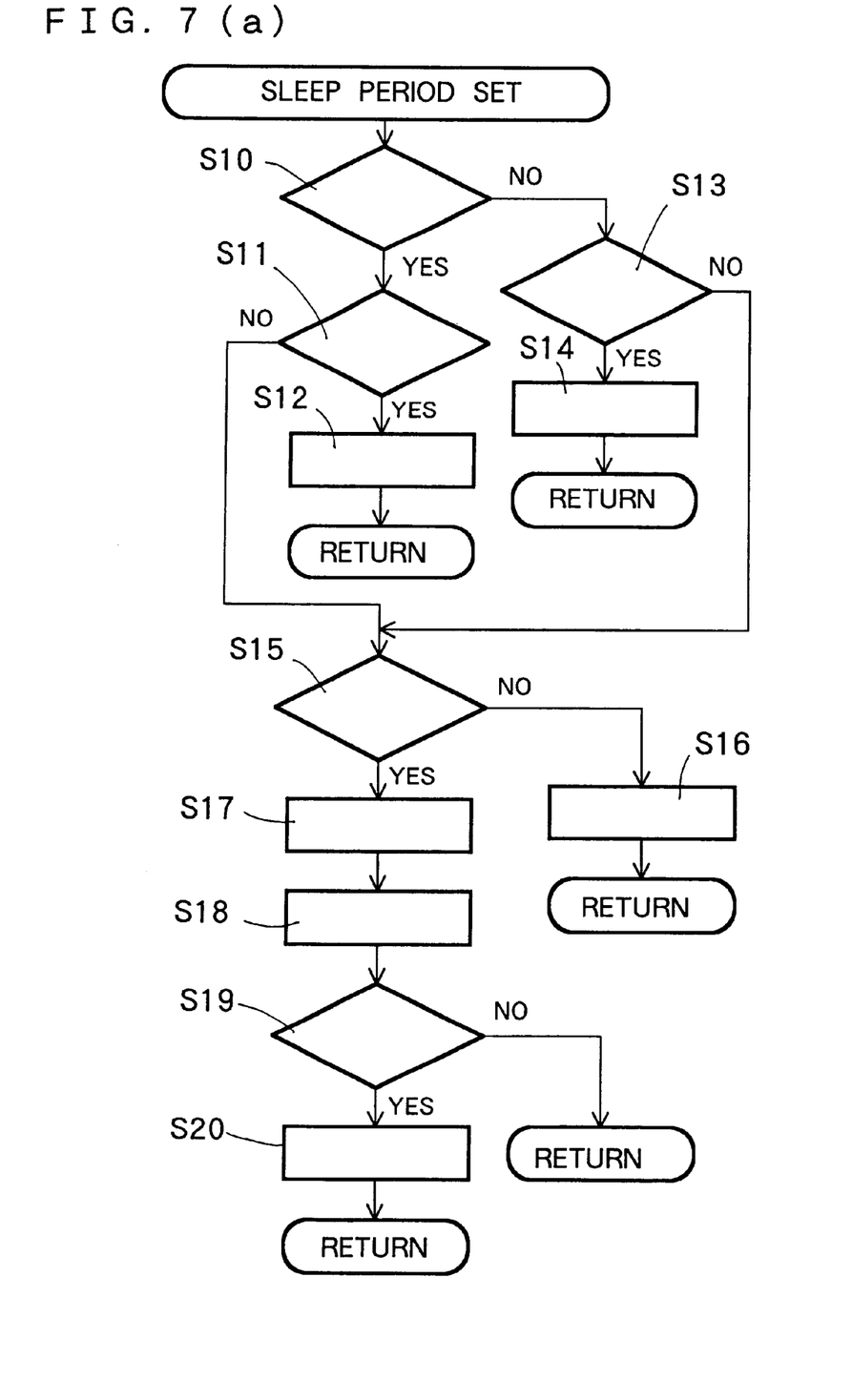
FIGS. 7(a) and 7(b) are a flowchart of a routine for control of a sleep time calculation setting process and a table of each action in the flowchart.
Figure 7B:
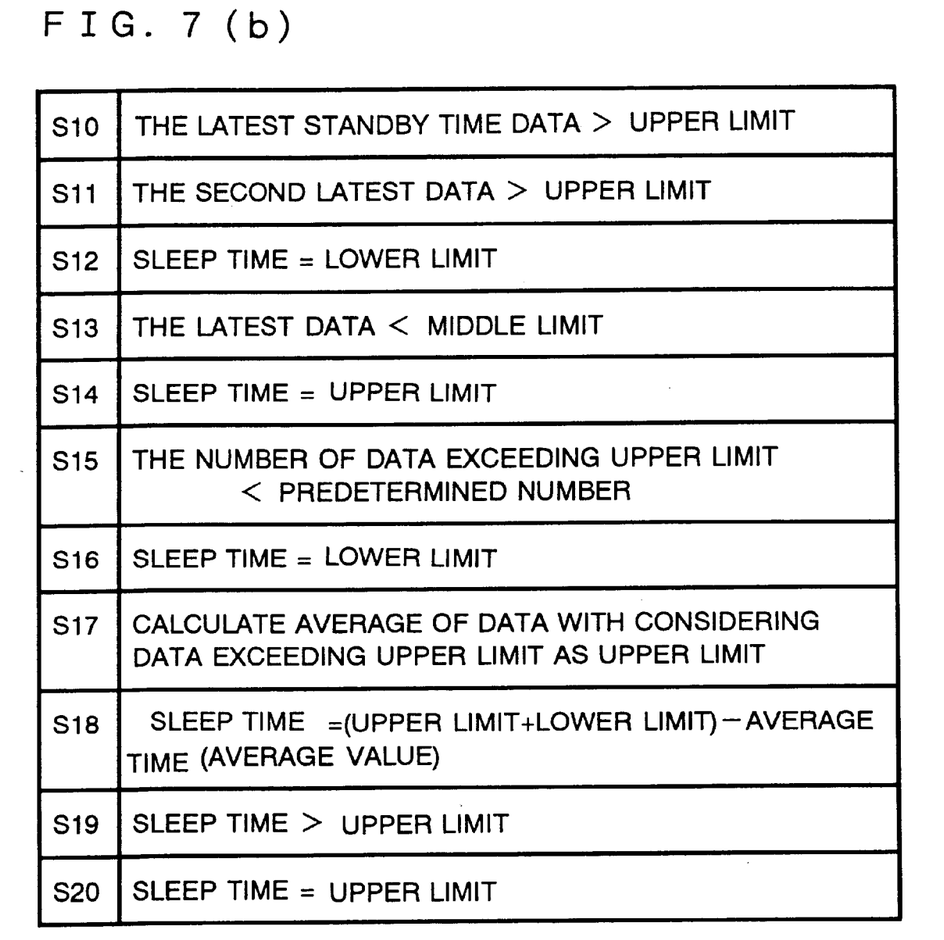

Next, the process for calculating a sleep time on the basis of the standby time data produced as above and stored in the standby time control section 73 is described, referring to FIGS. 7(a) and 7(b). FIG. 7(a) is a flowchart of a routine for control of a sleep time calculation setting process and FIG. 7(b) is a table of each action in the routine. Here, there are set a standby time upper limit, a standby time middle limit or value, and a standby time lower limit for standard values in a sleep time calculation. For example, they are set to the upper limit of 15 min., the middle value of 5 min., and the lower limit of 1 min. respectively, They also may be set to different values.

In FIG. 7, first, it is determined in S10 whether the latest standby time stored in the standby time control section 73 is larger than the standby time upper limit. When the latest time is larger than the upper limit (S10: YES), it is then determined in S11 whether the next (second) to the latest standby time is larger than the upper limit. When the second latest standby time is larger than the standby time upper limit (S11: YES), the lower limit is set as a sleep time in 512. For example, the sleep time is set to 1 min. More specifically, the latest standby time and the second latest standby time that both are larger than the upper limit shows a low frequency of use of the laser printer 40. At this time, the sleep time is shortened so that the printer can enter a sleep state as soon as possible to thereby reduce power consumption. on the other hand, the judgement in S11 is "NO", a flow advances to S15.

When the latest standby time is smaller than the upper limit (S10: NO), this time is further determined in S13 whether it is smaller than the standby time middle value. When it is smaller than the middle value (S13: YES), the same value as the upper limit is set as a sleep time. For example, the sleep time is set to 15 min. in the present embodiment. More specifically, the latest standby time smaller than the standby time middle value shows a high frequency of use of the laser printer. At this time, the sleep time is set longer so that the printer does not enter a sleep state soon to enable a prompt printing operation. When the judgement in S13 is "NO", on the other hand, the program advances to S15.

As clearly from a sequence of the above processes (S10: NO, S11: NO, S13: NO), the S15 and subsequent processes are to calculate the sleep time in case that the standby time stored in the standby time control section 73 is present between the standby time upper limit and the standby time middle value.

In S15, it is judged whether the number of standby time values exceeding the upper limit, among the standby time data stored in the standby time control section 73, is smaller than a predetermined reference number. In the present embodiment, for example, twenty standby time values are stored in the standby time control section 73 and the reference number is set to 5. However, those numerals may be changed.

When the number of standby time values exceeding the standby time upper limit is larger than the reference number (S15: NO), the same value as the standby time lower limit is set for the sleep time in S16. For example, as well as in S12, the sleep time is set to 1 min. in the present embodiment. If the number of standby time values is larger than the reference number, it shows a low frequency of use of the laser printer. Accordingly, a short sleep time is set in this case to reduce power consumption of the laser printer.

Also, when the number of standby time values exceeding the standby time upper limit is less than the reference number (S15: YES), considering the frequency of use of the laser printer 40 as middle, the standby time values stored in the standby time control section 73 is averaged in S17. At this time, the standby time values exceeding the standby time upper limit are replaced with the same value as the upper limit in the above average calculation so that the influence due to large differences in standby time values is reduced to set a proper sleep time in a sleep mode.

In S18, subsequently, the value obtained by subtracting the average value (average standby time) from the sum of the standby time upper limit and the standby time lower limit is set for the sleep time. In S19, it is determined whether the so set sleep time is larger than the standby time upper limit. When it is smaller (S19: NO), the process is completed. When it is larger (S19: YES), the standby time upper limit is set for the sleep time (S20). For example, the sleep time is set to 15 min. In this way, the value larger than the standby time upper limit is not set for the sleep time.

Figure 8:
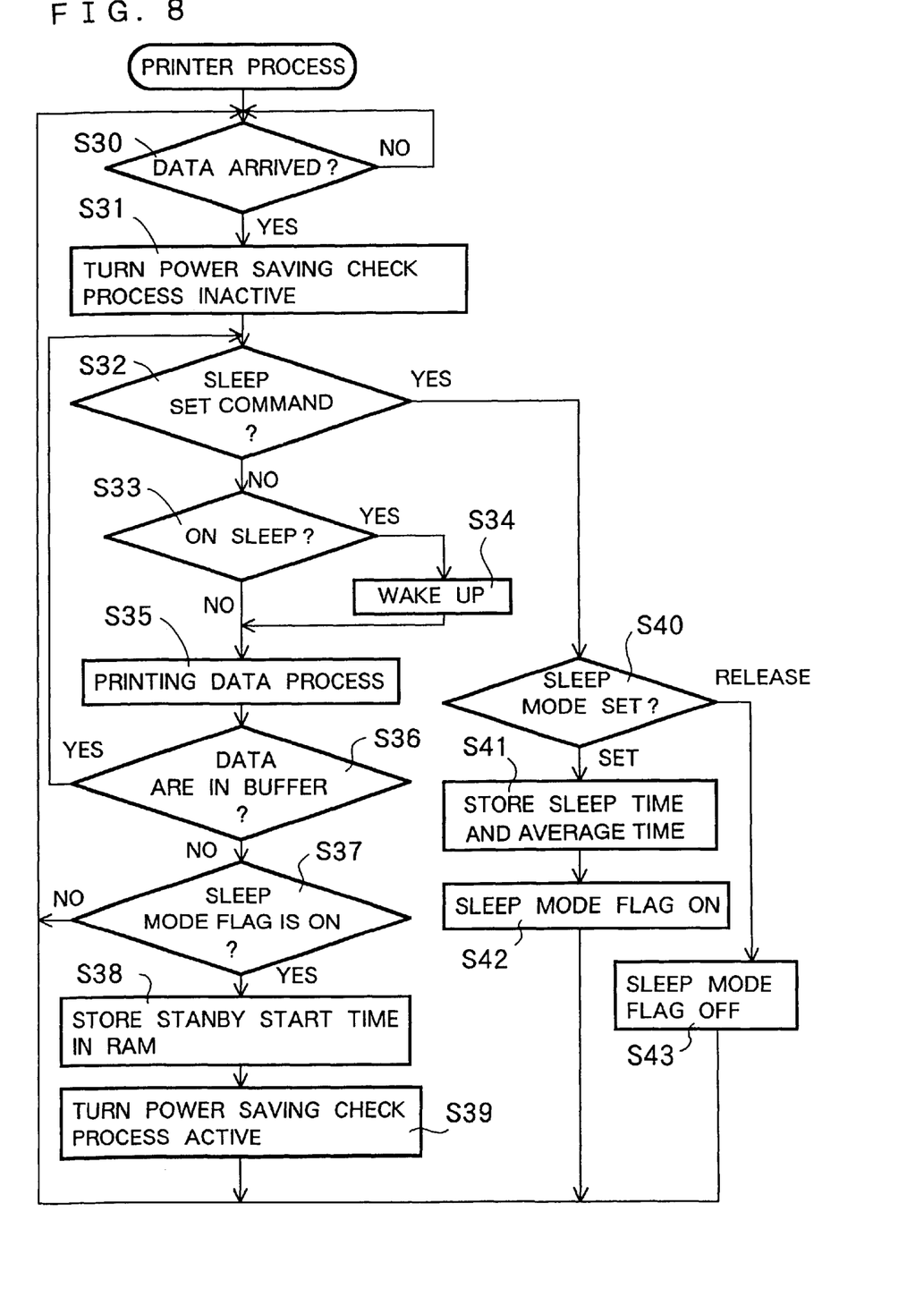
FIG. 8 is a flowchart of a routine for control of a printer process.

The sleep time set as above is shown, for example, in the following table, wherein a time interval means a standby time and a JOB means a printing process.

therein (S36: YES), the flow is returned to S32. In case of no printing data (S36: NO), the flow advances to S37. In S37, it is checked whether the sleep mode flag 54C in the RAM 54 is ON. If it is OFF (S37: NO), the flow is returned to S30. If it is ON (S37: YES), alternatively, the CPU 50 takes the present time from the timer 51 in S38 and stores it in the standby start time memory area 54A in the RAM 54. The CPU 50 then turns the power-saving check flag 54E into an ON state in S39 so that the power-saving check process is made active, and then returns the flow to S30.

On the other hand, in S32, when the sleep set command has been transmitted from the computer 12 (S32: YES), it is

TABLE 1

| | ① INTERVAL TIME FROM LAST JOB TO PRESENT TIME | ② INTERVAL TIME FROM SECOND JOB FROM LAST TO LAST JOB | ③ THE NUMBER OF INTERVAL TIME BEING MORE THAN 15 MIN. AMONG THE RECORDED JOBS (MAX 20) | ④ AVERAGE TIME OF INTERVAL TIME OF RECORDED JOBS | SET SLEEP TIME |
|---|---|---|---|---|---|
| (1) | MORE THAN 15 MIN. | MORE THAN 15 MIN. | — | — | 1 MIN. |
| (2) | LESS THAN 15 MIN. | — | — | — | 15 MIN. |
| (3) | MORE THAN 15 MIN. | 15 MIN. OR LESS | 5 OR MORE | — | 1 MIN. |
| (4) | 5–15 MIN. | — | 5 OR MORE | — | 1 MIN. |
| (5) | ✕ FOR DATA ① AND ② IN (3) OR (4) | | LESS THAN 5 | 15 MIN. | 1 MIN. |
| (6) | ✕ FOR DATA ① AND ② IN (3) OR (4) | | LESS THAN 5 | 14 MIN. | 2 MIN. |
| (7) | ✕ FOR DATA ① AND ② IN (3) OR (4) | | LESS THAN 5 | 13 MIN. | 3 MIN. |
| (8) | ✕ FOR DATA ① AND ② IN (3) OR (4) | | LESS THAN 5 | 12 MIN. | 4 MIN. |
| (9) | ✕ FOR DATA ① AND ② IN (3) OR (4) | | LESS THAN 5 | 11 MIN. | 5 MIN. |
| (10) | ✕ FOR DATA ① AND ② IN (3) OR (4) | | LESS THAN 5 | 10 MIN. | 6 MIN. |
| (11) | ✕ FOR DATA ① AND ② IN (3) OR (4) | | LESS THAN 5 | 9 MIN. | 7 MIN. |
| (12) | ✕ FOR DATA ① AND ② IN (3) OR (4) | | LESS THAN 5 | 8 MIN. | 8 MIN. |
| (13) | ✕ FOR DATA ① AND ② IN (3) OR (4) | | LESS THAN 5 | 7 MIN. | 9 MIN. |
| (14) | ✕ FOR DATA ① AND ② IN (3) OR (4) | | LESS THAN 5 | 6 MIN. | 10 MIN. |
| (15) | ✕ FOR DATA ① AND ② IN (3) OR (4) | | LESS THAN 5 | 5 MIN. | 11 MIN. |
| (16) | ✕ FOR DATA ① AND ② IN (3) OR (4) | | LESS THAN 5 | 4 MIN. | 12 MIN. |
| (17) | ✕ FOR DATA ① AND ② IN (3) OR (4) | | LESS THAN 5 | 3 MIN. | 13 MIN. |
| (18) | ✕ FOR DATA ① AND ② IN (3) OR (4) | | LESS THAN 5 | 2 MIN. | 14 MIN. |
| (19) | ✕ FOR DATA ① AND ② IN (3) OR (4) | | LESS THAN 5 | 1 MIN. | 15 MIN. |
| (20) | ✕ FOR DATA ① AND ② IN (3) OR (4) | | LESS THAN 5 | 0 MIN. | 15 MIN. |

Figure 9:
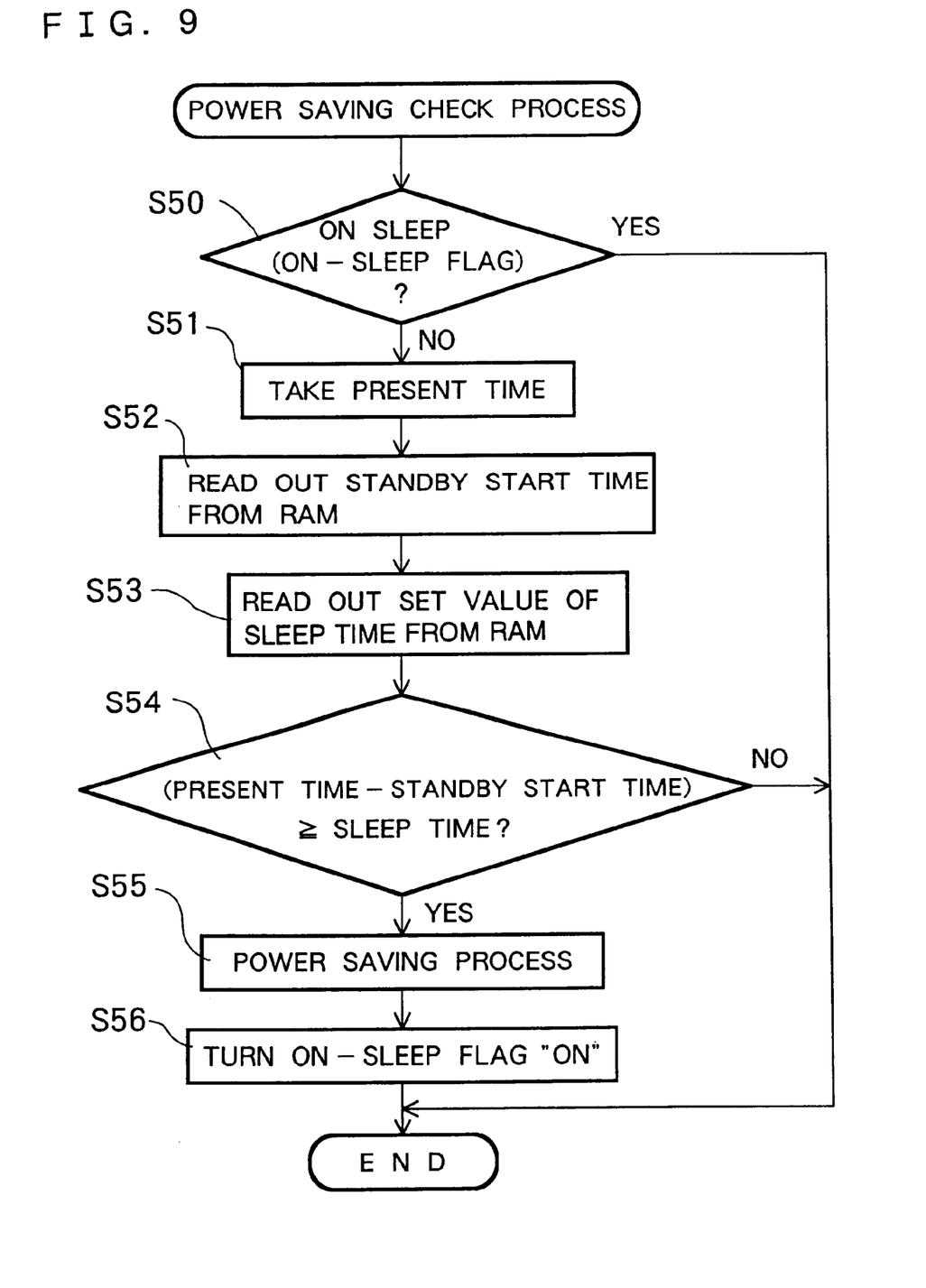
FIG. 9 is a flowchart of a routine for control of a power saving check process.

Next, explanation is made on a printer process and a power-saving check process executed in the laser printer 40 with reference to FIGS. 8 and 9. FIG. 8 is a flowchart of a routine for control of a printer process. FIG. 9 is a flowchart of a routine for control of a power-saving check process.

First, a printer process under the control of the CPU 50 will be described with FIG. 8. It is determined in S3 whether the printer has received a signal representative of printing data from the computer 12. When the laser printer has received the to printing data signal (S30: YES), the CPU 50 turns the power-saving check flag 54E into an OFF state in the RAM 54 so that a power-saving check process is made inactive to avoid the execution of unnecessary check process.

In S32, it is judged whether the computer 12 has output a sleep set command. If no sleep setting command has been output (S32: NO), the CPU 50 judges, referring to the on-sleep flag 54 in the RAM 54, whether the printer is in a sleep state. When the on-sleep flag 54 is set (S33 YES), indicating the sleep state, the CPU 50 instructs a warm-up operation of the heater in a fixing section, a laser scanner, a display on the control panel 48, and so on, to recover the printer from the sleep state (S34). At the same time, the on-sleep flag 54D is turned OFF. When the printer is not in a sleep state (S33: NO) or after S34, the CPU 50 executes a printing process for the printing data through the printing mechanism 62.

In 36, it is judged whether there are printing data in a printing buffer in the RAM 54. If there are any printing data detected whether the command is for setting or releasing a sleep mode. If it is for setting a sleep mode (S40: SET), the CPU 50 takes the sleep time and the average standby time obtained in the process shown in FIG. 7, which is transmitted along with the above command from the computer 12 through the printer driver PD, and stores them in the sleep time memory area 54B. Subsequently, the sleep mode flag 54C is turned ON in S42. The flow is returned to S30.

When the command is for releasing the sleep mode (S40: RELEASE), the sleep mode flag 54C is turned OFF in S43. The flow is returned to S30.

Next, the power-saving check process to check whether the printer should enter a sleep state is described referring to FIG. 9. This power-saving check process is an interruption process executed by the CPU 50 on the basis of an interruption timing that is given at a predetermined interval from the event timer 53. It is first judged whether the printer is in a sleep state, referring to the on-sleep flag 54D. When it is not in a sleep state (S50: NO), the CPU 50 obtains the present time from the timer 51 in S51, and reads out the standby start time from the standby start time memory area 54A in S52.

In S53, the set value of the sleep time is read out from the sleep time memory area 54B. In S54, it is judged whether the time value obtained by subtracting the standby start time read out in S53 from the present time taken in S52 is larger than or equal to the sleep time. When the judgement result in S54 is "YES", the CPU 50 executes a power-saving process which causes the printer to enter a sleep state in S55 and turns the on-sleep flag 54D ON in S56, thus completing the process. When it is determined in S50 that the printer is in a sleep state (S50: YES), and, when the time value obtained by subtracting the standby start time from the present time is smaller than the sleep time (S54: NO), the process is finished.

Figure 10:
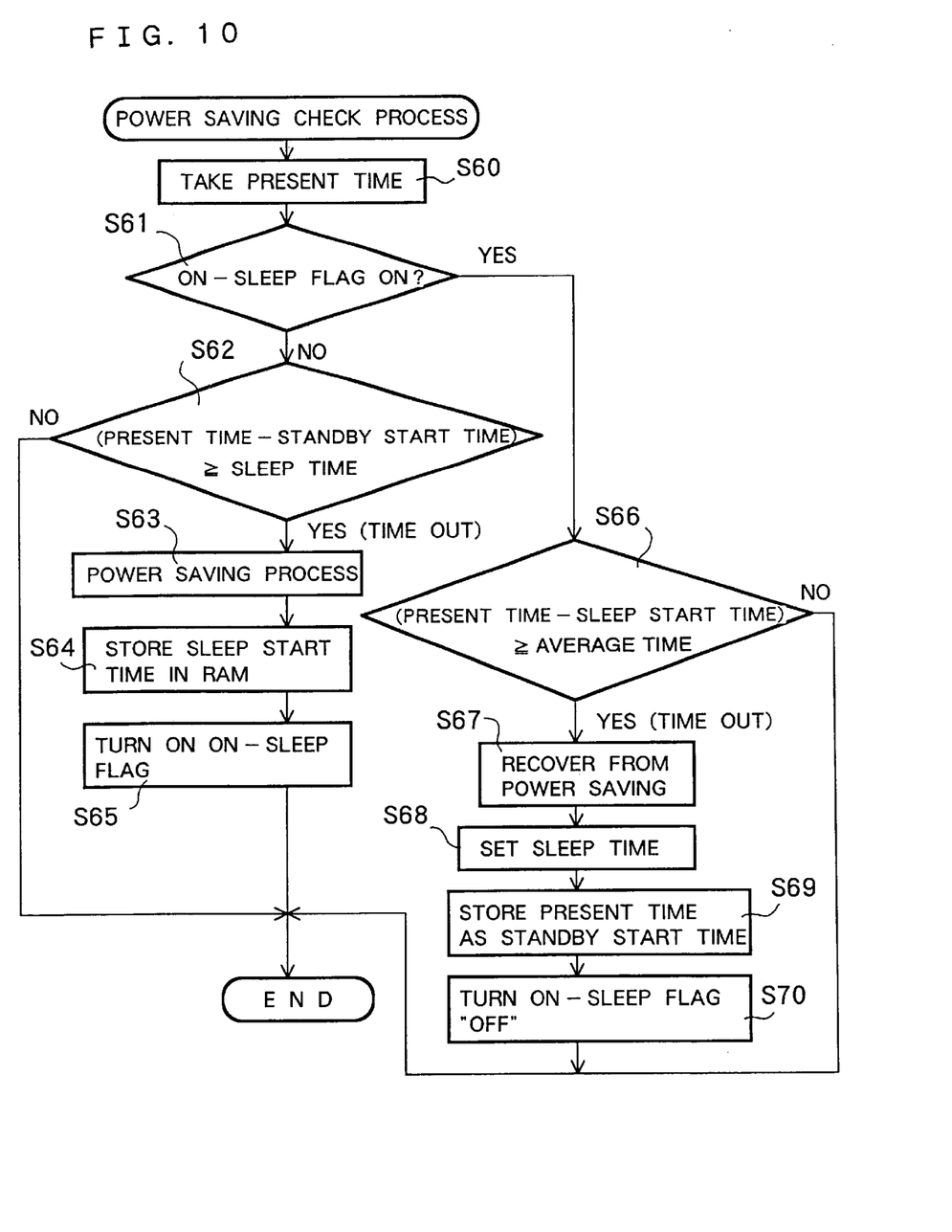
FIG. 10 is a flowchart of a routine for control of a different power-saving check process.

The above power-saving check process can be performed also in the process routine shown in FIG. 10. FIG. 10 is a flowchart of a routine for control of a different power-saving check process.

In S60, the CPU 50 takes the present time from the timer 51. In S61, the sleep check or the wake-up check is done referring to the on-sleep flag 54D. When the on-sleep flag 54D is OFF (S61: NO), the sleep check is done in S62 and subsequent processes. When the on-sleep flag 54D is ON (S54: YES), the wake-up check is done in S66 and subsequent processes.

When the judgement result is "NO" in S60, it is determined whether the time value obtained by subtracting the standby start time (read out from the standby start time memory area 54A) from the present time obtained in S60 is larger than or equal to the sleep time (read out from the sleep time memory area 54B). When the judgement result in S62 is "YES", the sleep time having passed, the power-saving process is executed in S63. After that, the CPU 50 takes the time at that moment from the timer 51 and stores it as a sleep start time in the RAM 54 in S64, and turns the on-sleep flag 54D into an ON state in S65. Thus, the process is completed. When the judgement in S62 is "NO", indicating that the sleep time has not passed yet, the process is immediately finished.

When it is determined in S61 that the on-sleep flag 54D is ON (S61: YES), it is judged in S66 whether the time obtained by subtracting the sleep start time from the present time is larger than or equal to the average standby time. If the judgement result in S66 is "YES", the average standby time having passed, in S67 the recovery process is executed to recover the printer from the power-saving state (the sleep state). After the recovery process executed in S67, if no printing data is transmitted from the computer 12, in S68, the time required to return the printer again into the power-saving state is set as the sleep time. In this embodiment, the average standby time transmitted from the printer driver PD is set as the sleep15/time in the sleep time memory area 54B. In S69, the present time given from the timer 51 is stored as the standby start time in the standby start time memory area 54A. In S70, the on-sleep flag 54D is turned OFF. Thus, the process is completed.

As mentioned above in detail, the printing system 1 in the present embodiment is arranged so that, as a result of judgement as to whether the latest standby time stored in the standby time control section 73 is larger than the standby time upper limit, when the latest standby time is larger than the upper limit (S10: YES) and that the second latest standby time is also larger than the upper limit (S11: YES), the standby time lower limit is set as the sleep time. Accordingly, considering the low frequency of use of the laser printer in that case, the sleep time is shortened to allow the printer to enter a sleep state as soon as possible, achieving the reduction of power consumption.

The standby time upper limit is set as the sleep time if the latest standby time is smaller than the standby time middle value (S13: YES), so that the sleep time is lengthened in consideration of the high frequency of use of the laser printer in that case, to allow the printer not to soon enter a sleep state. This enables a prompt printing process.

When the number of standby time values exceeding the standby time upper limit, in the standby time control section 73, is smaller than the predetermined reference number (15: YES), considering that the using frequency of the laser printer 40 is middle, the standby time data stored in the standby time control section 73 are calculated to provide an average value, and the time value obtained by subtracting the average value (the average standby time) obtained in S17 from the sum of the standby time upper limit and the lower limit. As a result thereof, a suitable sleep time for a sleep mode can always be set between the standby time upper limit and lower limit even if the standby time varies every moment.

Among the standby time values, the values exceeding the standby time upper limit, instead of being used as they are, are replaced with the same value as the standby time upper limit for the calculation of an average value to reduce the influence due to large differences in the standby time values so that the most suitable sleep time for a sleep made can be set.

The standby time lower limit is set as a sleep time when the number of standby time values having the standby time exceeding the standby time upper limit is larger than the predetermined reference number (S15: NO). It is thereby possible to shorten the sleep time in consideration of the high frequency of use of the laser printer, thus developing the power-saving.

The present invention may be embodied in other specific forms without departing from the spirit or essential characteristics thereof.

For instance, for the value of the standby time upper limit in the above embodiment, the upper limit (15 min.) of the sleep time that can be set on the printer side is used as it is. However, the value may be more than or less than the upper limit of the sleep time. Although the standby time middle value between the upper limit (15 min.) and the lower limit (1 min.) of the sleep time that can be set on the printer side is set to 5 min., the lower limit (1 min.) of the sleep time or other middle value (for instance, 3 min., 6 min.) may be used as a standard value.

In the above embodiment, the latest standby time value is stored every printing operation. It, however, is not always necessary to calculate the sleep time on the basis of all the standby time value every printing operation. In case of old record data, for example, the sleep time may be calculated on the basis of some data picked up therefrom.

In the above embodiment, it is judged whether the number of standby time values exceeding the standby time upper limit is less than the predetermined reference number in S15. However, it is not limited to the upper limit of the sleep time that can be set on the printer side. For example, the standard value for judgement may be larger or smaller than the upper limit. It is also possible to calculate a suitable sleep time on the basis of whether the number of standby time values less than the standby time lower limit is smaller than the predetermined number. In this case, without limiting to the lower value of the sleep time, the standard value for judgement may be larger or smaller than it.

Furthermore, in the embodiment, each sleep time value shown in the table 1 is set in accordance with the flowchart in FIG. 7 based on the standby time upper and lower limits and the average standby time. For instance, according to the selection by an user of the present system; whether the power saving or the prompt printing operation is given priority, the sleep time value obtained in the flowchart of FIG. 7 may be properly increased or decreased so that the sleep time value suitable for the selection may be set as the final sleep time in the beginning.

Meanwhile, the above embodiment is arranged so that, in the routine for the sleep time calculation set process, shown in FIG. 7, after judgement as to whether the latest standby time among data stored in the standby time control means is larger than a preset standard value, or the latest standby time and the previous standby time to the latest one are more than a preset standard value, it is judged whether the number of standby time values more than or less than the preset standard value is larger than the reference number, among the standby time values stored in the standby time control means, to set the sleep time. Instead of those processes, the sleep time may be set through S15 and subsequent processes, omitting each judging step in S10, S11, and S13.

More specifically, without the judgement as to whether the latest standby time is more than the preset standard value and the judgement as to whether the latest standby time and the previous standby time to the latest one are more than the preset standard value, the sleep time may be set considering whether the number of standby time values being more than or less than the preset standard value is more than the predetermined number among the standby time values stored in the standby time control means, and also considering the average of the standby time values.

In this case, further omitting the process of S15, the setting of the sleep time may be made in consideration of only the average value of the standby time values or in consideration of only whether the number of standby time values that are more than or less than the standard value is larger than the predetermined number among the standby time values.

Meanwhile, in the above embodiment, the printing system is arranged so that, considering that the start/end time of data transmission on the printer driver included in the computer system substantially corresponds to and the actual time of a printing operation in the printer, the sleep time is calculated in the printer driver based on the transmission start/end time of printing data output through the printer driver, and the so calculated sleep time is transmitted to the printer to execute a power-saving operation. The present invention is not limited thereto.

In the case that mutual communication can be made between the computer system and the printer, for example, the printing system may be constructed so that the printer transmits, upon completion of the printing operation, the command data representative of print end to the printer driver. This data transmission is executed before or after the process in S38 shown in FIG. 8, for instance. On receiving the command data indicative of print end, the printer driver controls the reception time as a print end time. The sleep time is calculated considering the period between the print end time and the next print start time (the print data transmission start time) as a standby time.

Figure 11:
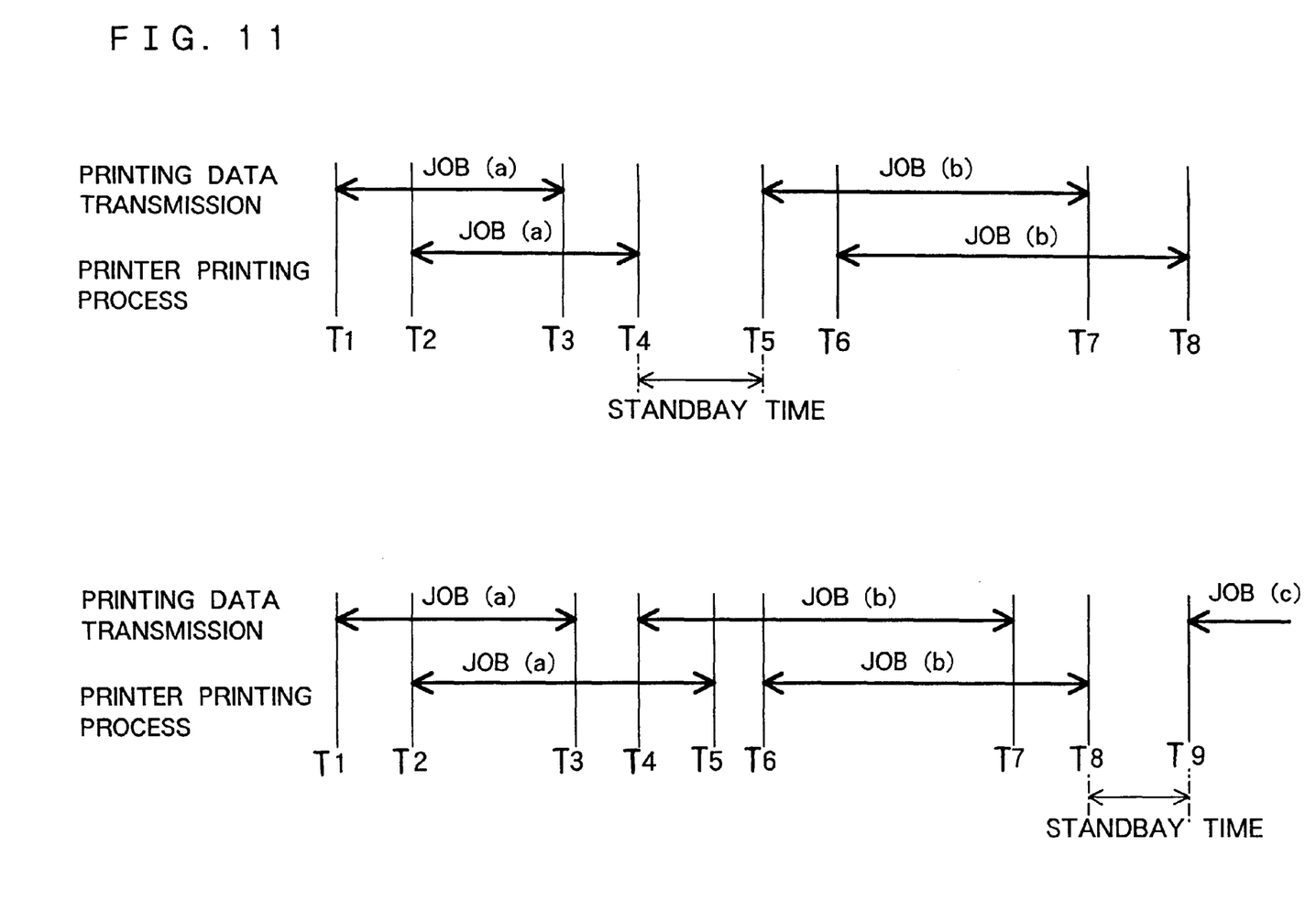
FIGS. 11(a) and 11(b) are time charts for showing the processing states of a print JOB.

In this regard, while a plurality of print execution processes (JOB) are in order carried out with a lapse of time, as shown in FIG. 11(A), for example, when the printing operation in the printer side, i.e., through the printing mechanism 62, in accordance with a print JOB(a) is finished at the time t4 and then the data transmission for the next print JOB(B) is started at the time t5, the period between the time t4 and time t5 is considered as a standby time to be recorded. For instance, in the case that, as shown in FIG. 11(B), the data transmission for the next print JOB(b) is started at the time T4 before the printing operation in the printer aide in accordance with the print JOB(a) is completed at the time T5, the print JOB(a) and (b) may be considered as a single JOB, which has no standby time between the JOB(a) and (b). The period between the time T8 at which the printing operation in the printer side through the printing mechanism 62 is finished and the time T9 at which the data transmission is started again for the next print JOB(c) is considered as a standby time.

Instead of regarding the print JOB(a) and (B) as a single print JOB as above, it is also possible to consider the standby time between the print JOB(a) and (b) to be "0", which is recorded.

The above method of calculating the sleep time by considering the period between the actual print end time of the printer and the next print start time (the print data transmission start time) as a standby time can be controlled within the printer if mutual communication is impossible for the computer system and printer. Also, if mutual communication is possible, the calculating method can be controlled within the printer. More specifically, the period between the actual print end time of the printer and the next print start time (the print data reception time, i.e., the print data transmission start time in the printer driver side) is considered and recorded as a standby time. Based on those data, the sleep time is calculated within the printer so that a power-saving operation is executed according to the sleep time.

In the above embodiment, the time for counting the present time is used for obtaining the standby time between the print end time and the next print start time. Using a timer-counter which starts a count operation at the time when a printing operation is completed, the standby time between the print end time and the next print start time may be calculated based on the count value of the timer-counter at a point of time when the next printing operation is started.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing system having a printer which enters a sleep mode when it does not receive print data for more than a sleep time which is defined as a time from completion of printing to entry in the sleep mode, the system comprising:

means for storing and controlling a standby time value for a corresponding printing operation of a plurality of printing operations, the standby time being a period between a start time of a present printing operation and an end time of a printing operation executed just before the present printing operation, the standby time being variable according to an operating condition of the printer; and means for calculating the sleep time based on standby time values stored in the standby time control means by putting weight on late values among the standby time values stored in standby time control means, wherein the sleep time calculated by the calculating means becomes shorter when the standby time becomes longer and the sleep time calculated by the calculating means becomes longer when the standby time becomes shorter and the standby time is equal to an actual sleep time plus sleep mode time.

2. A printing system according to claim 1, further comprising means for judging whether the latest one among the standby time values stored in the standby time control means is larger than a preset standard value;

wherein the sleep time calculation means sets the sleep time by determining, according to judgement of the judging means, whether a standby time value previous to the latest one should be considered to set the sleep time.

3. A printing system according to claim 2, wherein the judgement means determines whether a standby time value previous to the latest standby time value is larger than the standard value, and the sleep time calculation means sets the sleep time by selecting the standby time value previous to the latest one according to judgement of the judgement means as to whether the latest standby time value and the previous standby time value are both larger than the standard value.

4. A printing system according to claim 3, wherein the standard value is a standby time upper limit which is preset in the printer.

5. A printing system according to claim 4, wherein the judgement means determines whether the latest standby time value and the previous standby time value are both larger than the standby time upper limit; and the sleep time calculation means sets a standby time lower limit which is preset in the printer when the judgement means determines that the latest standby time value and the previous standby time value are both larger than the standby time upper limit.

6. A printing system according to claim 3, wherein the sleep time calculation means sets the sleep time based on whether a number of the standby time values exceeding the standard value is larger than a predetermined number when the standby time value previous to the latest standby time value is considered.

7. A printing system according to claim 6, wherein the sleep time calculation means sets a standby time lower limit which is preset in the printer when the judgement means determines that the number of the standby time values exceeding the standard value is larger than the predetermined number.

8. A printing system according to claim 6, wherein the sleep time calculation means sets the sleep time based on an average value of the standby time values when the standby time value previous to the latest standby time value is considered.

9. A printing system according to claim 8, wherein the standard value is a standby time upper limit which is preset in the printer; and the sleep time calculation means calculates the average value of the standby time values by considering the standby time values exceeding the standby time upper limit as the standby time upper limit.

10. A printing system according to claim 1, wherein the sleep time calculation means sets a sleep time according to selection as to which is given priority for power-saving or prompt printing operation.

11. A printing system according to claim 1, wherein the standby time control means and the sleep time calculation means are provided in a printer driver included in a computer system for transmitting print data to the printer.

12. A printing system according to claim 8, wherein the printer is provided with means for releasing the printer from a sleep state when the time set based on the average value has passed after entry of the printer into the sleep state.

13. A printing system having a printer which enters a sleep mode when it does not receive print data for more than a sleep time which is defined as a time from completion of printing to entry in the sleep mode, the system comprising:

means for storing and controlling a standby time value for a corresponding printing operation of a plurality of printing operations, the standby time being a period between a start time of a present printing operation and an end time of a printing operation executed just before the present printing operation, the standby time being variable according to an operating condition of the printer; and means for calculating the sleep time on the basis of the standby time values stored in the standby time control means by considering whether a number of standby time values exceeding a preset standard value, among the standby time values stored in the standby control means, is larger than a predetermined number, wherein the sleep time calculated by the calculating means becomes shorter when the standby time becomes longer and the sleep time calculated by the calculating means becomes longer when the standby time becomes shorter and the standby time is equal to an actual sleep time plus sleep mode time.

14. A printing system having a printer which enters a sleep mode when it does not receive print data for more than a sleep time which is defined as a time from completion of printing to entry in the sleep mode, the system comprising:

means for storing and controlling a standby time value for a corresponding printing operation of a plurality of printing operations, the standby time being a period between a start time of a present printing operation and an end of a printing operation executed just before the present printing operation, the standby time being variable according to an operating condition of the printer; and means for calculating the sleep time on the basis of the standby time values stored in the standby control means by considering an average value of the standby time values stored in the standby time control means, wherein the sleep time calculated by the calculating means becomes shorter when the standby time becomes longer and the sleep time calculated by the calculating means becomes longer when the standby time becomes shorter and the standby time is equal to an actual sleep time plus sleep mode time.

15. A printing system having a printer which enters a sleep mode when it does not receive print data for more than a sleep time which is defined as a time from completion of printing to entry in the sleep mode, the system comprising:

means for storing and controlling a standby time value for a corresponding printing operation of a plurality of printing operations, the standby time being a period between a start time of a present printing operation and an end time of a printing operation executed just before the present printing operation, the standby time being variable according to an operating condition of the printer; and means for judging whether a number of standby time values exceeding a standby time upper limit, among the standby time values stored in the standby time control means, is less than a predetermined number when the sleep time is set between the standby time upper limit and a standby time lower limit;

means for calculating an average value of the standby time values when the judgement means determines that the number of the standby time values exceeding the standby time upper limit is less than the predetermined number; and means for calculating the sleep time based on the average value of the standby time values calculated by the average calculating means, the standby time upper limit, and the standby time lower limit, wherein the sleep time calculated by the calculating means becomes shorter when the standby time becomes longer and the sleep time calculated by the calculating means becomes longer when the standby time becomes shorter and the standby time is equal to an actual sleep time plus sleep mode time.

16. A printing system according to claim 15, wherein the judgement means judges whether the latest standby time value stored in the standby time control means is smaller than a predetermined standby time middle value set between the standby time upper limit and the standby time lower limit, and the sleep time calculation means sets the standby time upper limit as the sleep time when the latest standby time value is smaller than the standby time middle value.

17. A printing system according to claim 16, wherein the sleep time calculation means calculates the sleep time by subtracting the average value of the standby time values from a sum of the standby time upper limit and the standby time lower limit.

18. A printing system according to claim 17, wherein the sleep time calculation means sets the standby time upper limit as the sleep time when the calculated sleep time value exceeds the standby time upper limit.

19. A control method for controlling a printer, comprising the steps of:

executing a printing operation in accordance with a printing command;

beginning to count a predetermined sleep time when completion of the printing operation, the printer entering a sleep mode when the predetermined sleep time is elapsed after the completion of the printing operation;

executing a subsequent printing operation is accordance with a subsequent printing command; and storing a standby time in a memory of the printer, the standby time being calculated as a time from the completion of the printing operation to beginning of the subsequent printing operation, wherein a plurality of the standby times are stored in the memory, the predetermined sleep time is calculated by putting weight on recent standby times among the plurality of the standby times stored in the memory and the standby time is equal to an actual sleep time plus sleep mode time.

* * * * *